United States Patent [19]

Feuling

[11] 4,206,600
[45] Jun. 10, 1980

[54] EXHAUST SYSTEM FOR FOUR-STROKE INTERNAL COMBUSTION ENGINES

[76] Inventor: James J. Feuling, 686 Ash Ave., Chula Vista, Calif. 92010

[21] Appl. No.: 910,649

[22] Filed: May 30, 1978

[51] Int. Cl.² ............................................. F02B 27/02
[52] U.S. Cl. ................................................... 60/312
[58] Field of Search ........................... 60/312, 314, 272

[56] References Cited

U.S. PATENT DOCUMENTS

| 2,147,200 | 2/1939 | Kadenacy | 60/314 |
| 2,168,528 | 8/1939 | Kadenacy | 60/314 |
| 3,716,992 | 2/1973 | Stahl | 60/323 |
| 3,946,558 | 3/1976 | Beekhuis | 60/312 |
| 3,983,696 | 10/1976 | Pflugfelder | 60/272 |

FOREIGN PATENT DOCUMENTS 818457  6/1937 France ........................................ 60/312

Primary Examiner—Douglas Hart
Attorney, Agent, or Firm—Frank D. Gilliam

[57] ABSTRACT

A high-efficiency combustion gas exhaust system for four-stroke internal combustion engines. This system uses two overlapping converging conical pipes to provide excellent scavenging at high piston speeds without the usual adverse effects at idle or moderate speeds. A generally conical converging first pipe is installed over the exhaust gas opening in the engine head. A second pipe with a generally converging conical introductory section is secured in an overlapping relationship to the first pipe. Certain size relationships among these components are important in obtaining optimum performance.

7 Claims, 5 Drawing Figures

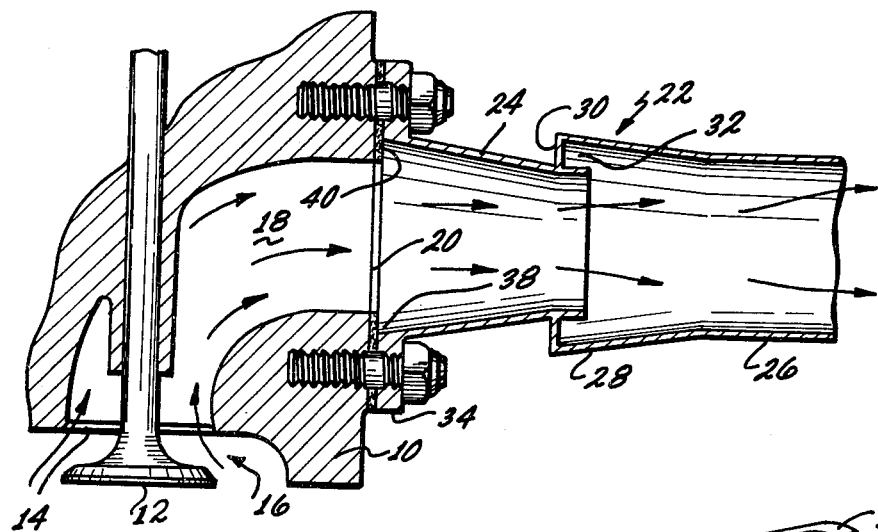
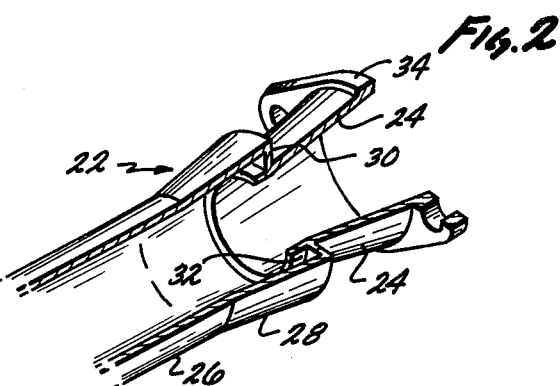
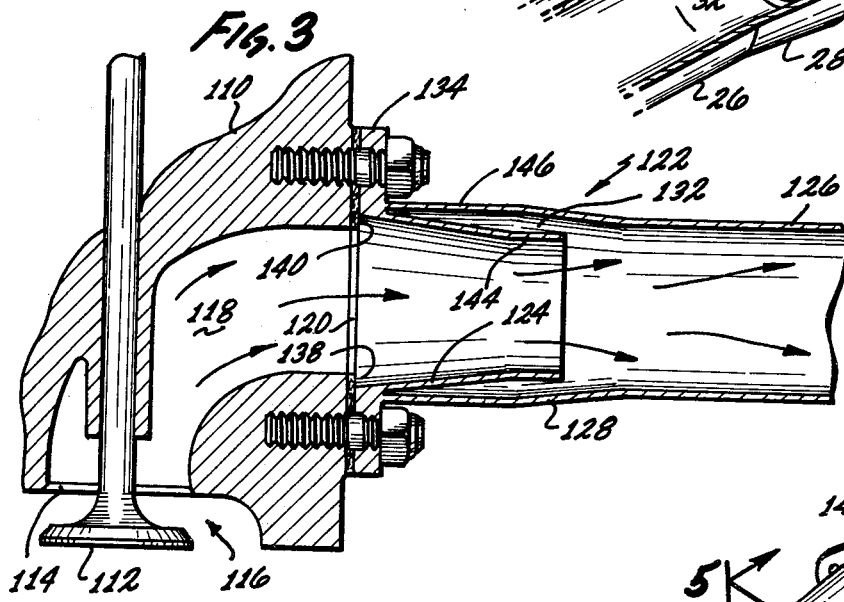
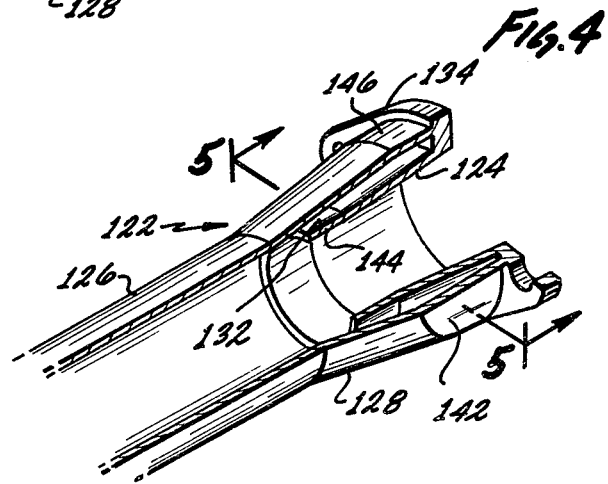
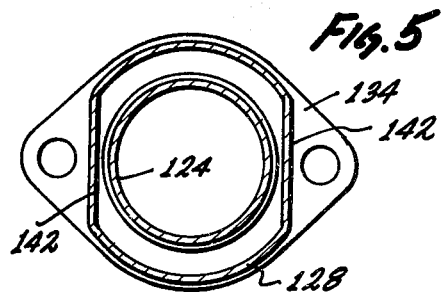

EXHAUST SYSTEM FOR FOUR-STROKE INTERNAL COMBUSTION ENGINES

BACKGROUND OF THE INVENTION

This invention relates in general to engine exhaust systems and, more particularly, to an improved exhaust system for four-stroke reciprocating internal combustion engines.

A great deal of effort has been expended over the years in improving the efficiency and power output of four-stroke piston engines, particularly for racing applications. Improvements in engine components and "super tuning" engines have resulted in racing engines producing well over one horsepower per cubic inch displacement. These engines have been perfected to the point where proportionally smaller improvements are becoming more difficult to achieve.

Tuned exhaust systems have been found to produce significant increases in power, especially in high speed racing engines.

One phenomenon employed in tuning an exhaust system has to do with the motions of sound pressure waves inside the exhaust system. These sound pressure waves having no mass travel at the speed of sound and consist of condensations and rarefactions in the gas. As a positive pressure wave resulting from the piston pushing gases out of the cylinder moves down to the end of the exhaust pipe and surges into the atmosphere, a negative wave (or slight vacuum) is created and moves back up the pipe. Ideally, the length of the exhaust system is such that a negative wave will arrive back at the engine exhaust valve just before the valve closes, so that the slight vacuum of the negative wave can aid in extracting the last of the combustion products from the cylinder.

The length of the exhaust pipe which provides the optimum scavenging from the negative wave can be determined from the empirical formula: $L = 120 \, V/N$, where "L" is the length of the pipe in inches from the valve head to the outer end, "N" is the desired peaking speed in revolutions per minute and "V" is the speed of the wave in the exhaust gases in feet per second. At usual temperatures and atmospheric pressure, "V" is about 1700 feet per second. In a racing engine, "N" will be about 7000 rpm. This produces an optimum pipe length of about 29 inches. Unfortunately, at idle speed, about 1000 rpm, optimum pipe length becomes about 204 inches. Thus, with the 29 inch high speed exhaust pipe, as engine speed drops from the optimum high speed, low speed reversion occurs causing the waves to become out of phase with the engine and instead of extracting gases from the cylinder, will compress gases back into the cylinder causing the engine to stutter and lose power. This is a significant problem with engines which must operate efficiently over a wide range of engine speeds.

Attempts have been made to improve the exhaust system efficiency by exhausting gases through a short nozzle into a relatively large volume which communicates with the final exhaust pipe. A typical such system, although for use in two-stroke engines, is disclosed in U.S. Pat. No. 2,168,528. While this system may have some advantages in a two-stroke engine, it does not appear suitable for a high efficiency four-stroke engine. The large volume into which the short exhaust nozzle empties will act similarly to the atmosphere and produce an immediate negative wave. As detailed above, this negative wave will, at best, arrive back at the cylinder at the proper time only over a very limited range of piston speeds.

Thus, there is a continuing need for improved exhaust systems for high efficiency four-stroke engines to make the maximum use of the "negative pressure wave" effect to optimize scavenging of exhaust gases at a wide range of engine operating speeds.

SUMMARY OF THE INVENTION

The above problems, and others, are overcome by an exhaust system for four-stroke reciprocating engines which comprises a generally conical converging first pipe for installation over the engine head exhaust opening and a second pipe with a generally conical converging introductory section secured to said first pipe in an overlapping relationship. The entrance opening of the first pipe is preferably larger than the engine head exhaust opening. The second pipe may overlap only slightly, providing a ring-like pocket between the two pipes in the overlapped region, or the second pipe may fully overlap the first pipe, providing a thinner ring-like pocket. In either case the pocket has a volume of from about two to twelve percent (2-12%) of the volume of the first pipe. As detailed below, the exhaust system may be optimized as to diameter and length to provide an optimum negative pressure wave effect over a broad range of engine operating speeds.

In dynamometer and fluid flow tests it has been found that this novel exhaust system provides improved engine performance with outstanding power at high speed without the engine sputtering and power loss problems at lower speeds characteristic of prior tuned exhaust systems. While the manner in which this system produces these results is not fully understood, it is thought that the exhaust pipe entrance configuration serves to even out the negative pressure wave returning up the pipe as it encounters the inter-pipe pocket so that the benefits of the negative pressure wave in extracting exhaust gases from the cylinder occurs over a greater range of engine speed.

The principal object of this invention is to reduce or eliminate the low and mid range effect of negative wave reversion.

BRIEF DESCRIPTION OF THE DRAWING

Details of the invention, and of preferred embodiments thereof, will be further understood upon reference to the drawing, wherein:

FIG. 1 is a vertical sectional view taken along the centerline of a first embodiment of the exhaust system and an associated engine head;

FIG. 2 is a partially cut-away perspective view of the embodiment of FIG. 1;

FIG. 3 is a vertical sectional view taken along the centerline of a second embodiment of the exhaust system and an associated engine head;

FIG. 4 is a partially cut-away perspective view of the embodiment of FIG. 3; and FIG. 5 is a sectional view taken on line 5—5 in FIG. 4.

DETAILED DESCRIPTION OF THE INVENTION

Referring now to FIGS. 1 and 2, there is seen a portion of the cylinder head 10 of a conventional four-stroke reciprocating engine. An exhaust valve 12 opens and closes valve opening 14 to allow combustion products to pass out of cylinder space 16 between the beginning and end of the exhaust stroke of a piston (not shown) in cylinder space 16. As indicated by the arrows within the exhaust system, exhaust gases flow through the exhaust channel 18 in head 10, through an opening 20 and into exhaust system 22.

As shown, exhaust system 22 includes a first generally combined conical converging and straight pipe 24 and a second pipe 26 attached thereto. Second pipe 26 includes a generally conical converging introductory section 28 which, in this embodiment, only slightly overlaps the outlet end of first pipe 24. The pipes are secured together and the overlap is closed by a wall 30. The overlapping pipes and wall 30 combine to form a ring-like pocket 32.

First pipe 24 is secured to head 10 by a flange 34 and bolts 36. A conventional gasket 38 is included between flange 34 and head 10 to assure a gas-tight seal. The entrance end of first pipe 24 is slightly larger than head opening 20, providing a slight expansion volume 40 in the corner between the entrance of pipe 24 and head 10. This volume 40 and inter-pipe pocket 32 serve to allow slight expansion or slowing of the flowing gases, while the converging conical first pipe 24 and introductory section 28 of second pipe 26 serves to slightly compress or speed the gas flow. As theorized above, these effects appear to smooth out or stretch the positive pressure wave as it starts down the exhaust system. Thus, the returning negative pressure wave will similarly be smoothed out or expanded in duration, so as to be effective over a wide range of engine speeds. Of course, if the entrance of first pipe 24 were very much larger than opening 20, or if pocket 32 were very large, the entering positive pressure wave would experience the same exit shock which occurs when the exhaust gases from the second pipe 26 reach the end and are dumped into the atmosphere. The large change in volume would cause the immediate formation of a severe negative pressure wave at each large expansion, which would then return to the cylinder space at other than the optimum times. For best results, the area of the entrance of first pipe 24 should be from about twenty to fifty percent (20–50%) larger than the area opening 20, the volume of pocket 32 should be from about two to twelve percent (2–12%) of the volume of first pipe 24, and the area across the outlet end of first pipe 24 should be about eighty to ninety percent (80–90%) of the cross-sectional area of opening 14. While first pipe 24 may have any suitable convergence, a length-to-entrance-diameter ratio of from about 0.8 to 1.2 gives best results. Generally, the outlet end of first pipe 24 and opening 20 should have approximately equal areas.

Second pipe 26 may have any suitable diameter. In general, best results are obtained with a diameter which provides a gas velocity therethrough of from about 250 to 350 feet per second, with optimum results generally obtained at about 300 feet per second. Optimum diameter can thus be empirically determined by measuring gas flow velocity with various sized pipes, or may be approximated by the following formula: $d^2 = PD^2/V$, where "d" is the diameter in inches of pipe 26, "P" is piston speed in feet per second, "D" is piston diameter in inches and "V" is the desired gas velocity in feet per second.

Optimum length of the exhaust system can be approximated by the empirical formula: $L = 120 \, V/N$, as discussed above. Since the resulting length is only an approximation, empirical testing of slightly longer and shorter pipes will be desirable for optimum results.

Referring now to FIGS. 3 and 4, there is seen a second embodiment of the exhaust system. As in the embodiment of FIG. 1, exhaust gases flow through a valve opening 114 and channel 118 in engine head 110 from cylinder space 116 to an exhaust system 122 when valve 112 is opening during the exhaust stroke of a piston (not shown) in cylinder space 116. The exhaust gases pass from opening 120 into generally conical converging first pipe 124 then through second pipe 126 to the atmosphere. In this embodiment, an introductory section 128 of second pipe 126 (which may contain cylindrical and conical converging portions) completely overlaps first pipe 124. Thus, a wide, thin ring-like pocket 132 is formed between the two pipes. In this arrangement, both pipes 124 and 126 are secured directly to flange 134 for additional rigidity. Since the volumetric relationships between pocket 132 and first pipe 124 are the same as described in conjunction with the embodiment of FIG. 1, above, the outer pipe 126 may be narrower where it overlaps inner pipe 124 while providing the same volume in pocket 132. Where several exhaust pipes are closely spaced, the narrower configuration may be preferred. As described above with respect to FIG. 1, the entrance opening of first pipe 124 should be similarly slightly larger than opening 120, providing a corner volume 140. Also, as seen in FIGS. 4 and 5, the outer second pipe 126 may be flattened on the sides at 142 to permit close spacing of bolts 136 which hold flange 134 to head 110 with gasket 138 therebetween.

While first pipe 124 and introductory section 128 of second pipe 126 have overall converging approximately conical shapes, if desired, cylindrical portions such as 144 and 146 may be used.

While certain specific proportions and arrangements have been described in the above description of preferred embodiments, these may be varied, where suitable, within the limits described above.

Other variations, ramifications and applications of the present invention will occur to those skilled in the art upon reading the present disclosure. These are intended to be included within the scope of the invention, as defined in the appended claims.

Having thus described the invention, which is claimed as new and useful and desired to be secured by U.S. Letters Patent, I claim:

1. An exhaust system for a four-stroke reciprocating internal combustion engines having an exhaust gas channel from an exhaust valve to an opening in an engine head surface, which comprises:

a generally conical conveying first pipe having a larger inlet end adapted to be secured to said head surface around said opening with the smaller outlet end extending away from said opening, wherein the area of the first pipe inlet opening is from about twenty to fifty percent (20–50%) larger than the area across said opening in said head surface; and a second pipe connected to said first pipe in a generally continuous fluid flow relationship therewith; said second pipe having a generally conical converging introductory section, the larger inlet end of which surrounds the outlet end of said first pipe and is secured thereto in a fluid tight overlapping relationship forming a ring-shaped pocket therebetween; the volume of said pocket being from about two to twelve percent (2–12%) of the volume of the first pipe.

2. The exhaust system according to claim 1 wherein said outlet end of said first pipe has an area of from about eighty to ninety percent (80–90%) of the cross-sectional area of the engine exhaust valve opening.

3. The exhaust system according to claim 1 wherein said first pipe has a length to inlet end diameter ratio of from about 0.8 to 1.2.

4. The exhaust system according to claim 1 wherein said second pipe has a diameter sufficient to provide gas flow therethrough at about 300 feet per second at optimum engine operating speed.

5. The exhaust system according to claim 1 wherein said exhaust system has a length sufficient to provide an appreciable extractor effect and to provide a negative pressure wave which will reach the engine exhaust valve just prior to completion of an exhaust cycle when said engine is operating over an appreciable range of speeds, including the optimum power output speed of the engine.

6. The exhaust system according to claim 1 wherein said second pipe only slightly overlaps said first pipe and the space between the end of said overlapping first pipe and the outer wall of said first pipe is filled by a ring-shaped wall.

7. The exhaust system according to claim 1 wherein said second pipe overlaps the entire length of said first pipe.

* * * * *